United States Patent Office
3,629,452
Patented Dec. 21, 1971

3,629,452
METHOD OF REDUCING EXCESSIVE SECRETIONS OF SEBUM BY ORAL ADMINISTRATION OF AMINO ACID DERIVATIVES
Gregoire Kalopissis and Georges Manoussos, Paris, France, assignors to L'Oreal, Paris, France
No Drawing. Filed Feb. 19, 1968, Ser. No. 706,652
Int. Cl. A61k 27/00
U.S. Cl. 424—319
2 Claims

ABSTRACT OF THE DISCLOSURE

A treatment for seborrhea in which certain cysteamine compounds, such as S-carboxymethyl cysteamine hydrochloride and S-benzyl cysteamine hydrochloride, are orally administered, preferably in the form of their acid salts.

---

The present invention relates to new compositions permitting the effective oral treatment of seborrhea.

It has already been proposed that the appearance of hair be improved by using compositions containing cysteine derivatives. In particular, it has been suggested that certain types of hair be treated for their greasy appearance by applying to the scalp capillary compositions containing at least one active compound having the following formula:

R—S—CH₂—CH—COOH
           |
           NH₂ in which R represents: either the $(C_6H_5)_3$—C— radical, or the $(C_6H_5)_2$—CH— radical, or the $C_6H_5$—CH₂— radical, or the HOOC—(CH₂)ₙ— radical, $n$ being a whole number less than or equal to 4 and preferably equal to 1 or 2.

After further work, it has been discovered that it is possible to effectively treat the seborrhea itself, when of a pathological nature, by giving certain cysteine or cysteamine derivatives to the patient orally.

The object of the present invention is to provide a new medication for the oral treatment of seborrhea, this medication being essentially characterized by the fact that it contains at least one active compound chosen from the group consisting of:—the compounds having the following formula:

R—S—CH₂—CH—COOH
           |
           NH₂ in which R represents: either the $(C_6H_5)_3$—C— radical, or the $(C_6H_5)_2$—CH— radical, or the $C_6H_5$—CH₂— radical, or the HOOC—(CH₂)ₙ— radical, $n$ being a whole number less than or equal to 4 and preferably equal to 1 or 2; the compounds having the following formula:

R₃—S—C—(CH₂)ₙ—CH₂—NH₂
      |
      R₁
      |
      R₂ in which:
R₁ and R₂ represent hydrogen atoms or lower alkyl radicals, and may be the same or different,
R₃ represents a radical having the formula —(CH₂)ₚ—R₄ in which R₄ represents:
—C₆H₅, or —COOR₅ (R₅=H or lower alkyl) or the tertiobutyl radical —C(CH₃)₃, or the trityl radical —C(C₆H₅)₃, or —CH₂—NH₂, or

—CH—NH₂
|
COOR₅ or the 2-thienyl radical:

or the 2-(N-oxypyridyl) radical:

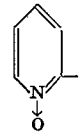

and in which:
p is equal to 0.1 or 2,
n is equal to 0 or 1.

In accordance with the invention, the active compounds defined above may be used in the form of their salts with an organic or mineral acid such, for example, as the halohydric acids, salicylic acid, paratoluenesulfonic acid, citric acid, phosphoric acid, malic acid, tartaric acid, nicotinic acid or ascorbic acid.

According to the invention, the active compounds may also be used after one of the hydrogens of their amine function has been substituted by a —COR or —SO₂R radical in which R represents a lower alkyl or an aryl radical.

Among the active compounds which may be used according to the invention are:

—S-trityl-l cysteine having the formula:

$(C_6H_5)_3$—C—S—CH₂—CH—COOH
                      |
                      NH₂

—S-trityl-l cysteine hydrochloride having the formula:

$(C_6H_5)_3$—CS—CH₂—CH—COOH, HCl
                      |
                      NH₂

—S-(carboxy-2-ethyl)-l cysteine having the formula:

HOOC—CH₂—CH₂—S—CH₂—CH—COOH
                              |
                              NH₂

—S-(carboxy-2-ethyl)-l cysteine hydrochloride having the formula:

HOOC—CH₂—CH₂—S—CH₂—CH—COOH, HCl
                              |
                              NH₂

—S-(carboxymethyl)-l cysteine having the formula:

HOOC—CH₂—S—CH₂—CH—COOH
                      |
                      NH₂

—N-acetyl-S-carboxymethyl l-cysteine having the formula:

HOOC—CH₂—S—CH₂—CH—COOH
                      |
                      NH—CO—CH₃

—N-acetyl-S benzyl l cysteine having the formula:

C₆H₅—CH₂—S—CH₂—CH—COOH
                      |
                      NH—CO—CH₃

—S-(methoxy carbonylmethyl)-l-cysteine having the formula:

CH₃OOC—CH₂—S—CH₂—CH—COOH
                          |
                          NH₂ and its hydrochloride,

—S-(methoxy carbonyl methyl)-l-methylcysteinate having the formula:

CH₃OOC—CH₂—S—CH₂—CH—COOCH₃
                          |
                          NH₂

—S-(methoxy carbonyl methyl)-*l*-methyl cysteinate hydrochloride having the formula:

CH₃OOC—CH₂—S—CH₂—CH—COOCH₃, HCl
|
NH₂

—S-carboxymethyl-cysteamine having the formula:

HOOC—CH₂—S—CH₂—CH₂—NH₂ and its hydrochloride,

—S-trityl-cysteamine having the formula:

(C₆H₅)₃C—S—CH₂—CH₂—NH₂ and its hydrochloride,

—S - benzyl - cysteamine hydrochloride, having the formula:

C₆H₅—CH₂—S—CH₂—CH₂—NH₂, HCl

—The chloride of (3-β-aminoethylthio-2-hydroxy)-propyltrimethylammonium hydrochloride, having the formula:

(CH₃)₃N⁺—CH₂—CHOH—CH₂—S—CH₂—CH₂—NH₂, HCl
|
Cl⁻

—N-acetyl S-benzylcysteamine having the formula:

C₆H₅—CH₂—S—CH₂—CH₂—NH—CO—CH₃

—The dicitrate of S-benzylcysteamine having the formula:

CH₂—CO₂H, H₂N—CH₂—CH₂—S—CH₂—C₆H₅
|
HO₂C—C—OH
|
CH₂CO₂H, H₂N—CH₂—CH₂—S—CH₂—C₆H₅

The salicylate of S-benzylcysteamine having the formula:

C₆H₅—CH₂—S—CH₂—CH₂—NH₂, HO₂C—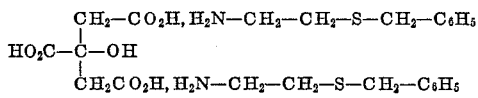

The p-toluenesulfonate of S-benzylcysteamine having the formula:

C₆H₅—CH₂—S—CH₂—CH₂—NH₂, HO₃S—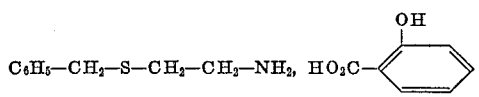—CH₃

The nicotinate of S-benzylcysteamine having the formula:

C₆H₅—CH₂—S—CH₂—CH₂—NH₂, HO₂C—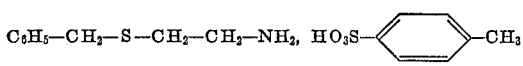

—S - benzylcysteamine hydrobromide, having the formula:

C₆H₅—CH₂—S—CH₂—CH₂—NH₂, HBr

—S-benzylcysteamine ditartrate, having the formula:

C₆H₅—CH₂—S—CH₂—CH₂—NH₂, HO₂C—CHOH
C₆H₅—CH₂—S—CH₂—CH₂—NH₂, HO₂C—CHOH

—S-benzylcysteamine malate having the formula:

C₆H₅—CH₂—S—CH₂—CH₂—NH₂,
HO₂C—CH₂—CHOH—CO₂H

—S-benzylcysteamine dihydrogenophosphate having the formula:

C₆H₅—CH₂—S—CH₂—CH₂—NH₂, H₃PO₄

—S-thenylcysteamine, having the formula:

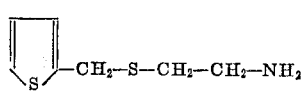

and its hydrochloride.

The N-oxide of 2-(2-amino-ethylthio)-pyridine, having the formula:

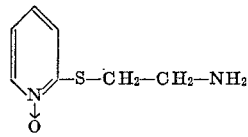

and its hydrochloride.

The ascorbate of S-benzylcysteamine having the formula:

C₆H₅—CH₂—S—CH₂—CH₂—NH₂, C₆H₈O₆

Some of the above-described compounds are known chemical compounds, others have been invented by Gregoire Kalopissis and are described in U.S. patent application Ser. No. 602,480 filed Dec. 19, 1966.

The new compounds may be prepared by reacting a mercaptan on a haloamine, the mercaptan and the amine each having a structure dependent on the compound which is to be produced.

This reaction may, for example, be carried out in an alcoholic sodium alcoholate solution.

The active compounds may be introduced into the medicinal compositions according to the invention at a concentration of between 0.75 and 3% by weight, and preferably of between 1 and 1.5%.

The active compounds may be dissolved in a alimentary liquid, such as an aqueous or hydro-alcoholic solution which may be aromatized.

They may also be incorporated into any ingestable pharmaceutical excipient. They may then take, for example, the form of granules, pills or tablets.

The posology of the medication according to the invention has no strict requirements. However, it is preferable to treat ordinary cases of seborrhea, by giving the patient doses of 100 mg. per 24 hours, for a series of 15 days, with breaks of 15 days between successive series. Based on the weight of the patient, the rate of dosage of the composition of this invention is about 1 to 5 mg./kg./day.

Tests have shown that the active compounds according to the invention are non-toxic. The tests run on animals have not permitted determination of the lethal dose, since this latter has not been reached by dosing the treated animals with the maximum amount of the product that it is practically possible to administer.

In order to show the characteristic properties of the medicaments, I will now describe, purely by way of example, several tests which have been carried out on a mixture of 70% S-(methoxycarbonyl-methyl)-*l*-cysteine hydrochloride and 30% S-carboxymethyl-cysteine hydrochloride, said mixture being hereinafter designated as mixture A.

TOXICITY TESTS

These tests were carried out on rats which have had the same breeding, having been fed with rat cakes (containing meat, liver, fish, vegetables), carrots, and water at will.

These tests were also carried out on mice which had been fed mouse pellets (containing meat and various leguminous meals) and of course water at will.

The tests were carried out on these two kinds of animals all the administrations having been made after a short period without food.

The tests on the rats were carried out on male and female animals of the Wistar strain weighing about 120 g. to 5 g.

One group of 40 male rats was divided into two groups I and II each comprising 20 animals. Another group of 40 female rats was divided into two groups III and IV, each comprising 20 animals.

With the aid of a esophageal pipette 3 g. of mixture A per kg. of animal, dissolved in water, was administered orally to each unfed animal in groups I and III, the amount given being approximately 0.7 ml. per animal.

The tests on mice were carried out on mice of the Swiss strain, weighing about 25 grams ±2 grams.

One group of 40 male mice was again divided into two groups I and II of 20 animals each and a group of 40 female mice was divided into two groups III and IV of 20 mice each.

Using an esophageal pipette, 1 g. of mixture A per kg. of animal, dissolved in water, was administered orally to each unfed animal in groups I and III, the amount given being about 0.40 ml. per animal.

The rats and mice in groups II and IV received only an equal volume of water and were used as control groups.

After 72 hours, no deaths were noted among any of the two types of animals.

At the autopsy, there was no sign of any perturbation, lesion or anomaly which could differentiate between the treated animals and the control animals.

Tests for chronic toxicity were also carried out on groups of rats and mice, subdivided into four groups as described above, the male and female animals being brothers and sisters in every case.

Each rat in group I was given orally by means of an esophageal pipette a daily dose of 150 mg./kg. of animal of mixture A for four weeks.

These doses were given to animals which had not recently been fed, each rat receiving a total of 4.2 g./kg. of the active compound.

The animals in control of group II received only equal volumes of water.

The two groups III and IV of female rats were given the same treatment respectively.

The same tests were carried out on four groups of male and female mice. Groups I and III received daily for four weeks, 50 mg./kg. of body weight of mixture A, each animal receiving a total of 1.4 g./kg. during this period with groups II and IV receiving only equal volumes of water.

At the end of this period, no deaths had been recorded and the growth of all the animals of both species continued normally, there being no discernable difference between the treated animals and the control animals.

At the autopsy, no lesion was discovered on any organ and an examination of urine and blood revealed no difference between the treated animals and the control animals. In particular, there was no quantitative or qualitative alteration in the hemograms of the treated animals treated with the mixture A.

From these tests it may be concluded that the active compound is non-toxic.

The same tests for toxicity were carried out with S-benzyl-cysteamine hydrochloride, malate and nicotinate of S-benzyl-cysteamine as well as S-carboxymethyl cysteamine.

Subcutaneous injection of 150 mg. per kilogram on a lot of 20 "Swiss" male mice each weighing between 24.8 g. and 25.5 g. did not result in a single death.

Oral injection of 200 mg./kg. on a lot of 20 "Swiss" male mice each weighing between 24.8 g. and 25.2 g. did not result in a single death.

Subcutaneous injection of 400 mg./kg. on 10 Wistar rats of both sexes each weighing between 90 g. and 110 g. did not result in a single death.

Oral injection of 300 mg./kg. on a lot of 10 Wistar rats of both sexes each weighing between 90 g. and 110 g. did not result in a single death.

TESTS FOR THE ANTI-SEBORRHEIC EFFECT

The tests concerning the anti-seborrheic effect were carried out on four groups of 20 Wistar rats which were raised in the same way and which were all brothers and sisters, groups I and II being made up of male rats while groups III and IV were made up of female rats.

Each of the male animals weighed about 220 g. ±10 g., while each of the female animals weighed about 190 g. ±10 g.

All these animals had previously undergone treatment with a diet deficient in biotin, so as to produce a marked seborrheic state: a bushy, sticky, matted coat, with hair falling out at different points on the animal's body.

When the pathological state due to seborrhea had been clearly established, the animals in groups I and III were treated orally by means of an esophageal pipette, after having been left unfed for a certain period, with a daily dose of 50 mg./kg. of body weight of mixture A. This treatment lasted for 15 days.

At the same time, all the animals in groups II and IV received equal volumes of water.

On the 16th day, all the animals in all four groups were given a dose of 50 mg./kg. of mixture A which had been made radioactive and had an activity of $36\mu.C.i.$ Each of the animals was isolated in a metabolism cage and their urine and stools were collected and used to measure the radioactivity.

The animals then underwent a clinical examination which made it possible to note that on the animals of groups I and II, the seborrheic lesions had notably diminished in intensity and size, the coat being almost dry and not appearing greasy or sticky, and no longer matted.

On the contrary, the animals in groups II and IV showed no improvement and even in some cases showed aggravation.

The reduction of biotin in the diet had been continued for all the animals for the duration of the treatment.

At the autopsy, it was noted that the liver of the animals of groups I and III which had been treated according to the invention was found to be in an essentially normal state, while the liver of the control animals appeared hypertrophic and in places degenerated.

The histologic examinations carried out on samples of skin showed a clear decrease in the volume of the sebaceous glands in the treated animals, while the sebaceous glands of the control animals, were large and showed evidences of rupture of the gland.

A measurement of the cutaneous lipides was also carried out on almost the whole skin of each animal. This showed a decrease of about 20% in the amount of lipide in the treated animals as compared to the control animals.

Examinations of the radioactivity proved that the skin of the control animals was two times more radioactive than that of the treated animals indicating a significant avidity of the organism for the compounds of the mixture A in those subjects evidencing seborrhea.

Tests of the toxicity and anti-seborrheic effect of the anti-seborrheic products described in this application have been carried out on S-carboxymethyl cysteamine as well as the malate and nicotinate of S-benzylcysteamine.

Compositions containing the active product and suitable for oral administration to human beings have been prepared and representative examples of such products follow:

EXAMPLE 1

The following anti-seborrheic composition, adapted to be orally administered drop by drop, is prepared:

|  | G. |
|---|---|
| S-carboxymethylcysteamine hydrochloride | 10 |
| Glycerine | 40 |
| Ethyl alcohol | 30 |
| Water, q.s.p. | 100 |
| Tincture of lemon (q.s.p. impart an attractive aroma) | |

The oral administration of this composition at the rate of 10 drops a day for 15 days to a person suffering from seborrhea results in a substantial regression in seborrheic secretion.

EXAMPLE 2

Capsules containing the following composition are prepared:

S-benzylcysteamine hydrochloride—50 mg.
Glucose—300 mg.
Water, q.s.p.—5 ml.
Orange sugar (sufficient to impart a pleasing aroma)

The oral administration of this product at the rate of 2 capsules a day for 15 days to a person having greasy hair due to excessive secretion of sebum substantially improves the condition of the scalp and the appearance of the hair.

EXAMPLE 3

An antiseborrheic syrup having the following composition is prepared:

S-benzylcysteamine salicylate—650 mg.
Water, sufficient to dissolve
Raspberry syrup—250 ml.

This syrup, when taken at the rate of a soupspoonful a day, is an effective treatment for seborrhea.

EXAMPLE 4

Lozenges for oral consumption having the following composition are prepared:

|  | Mg. |
|---|---|
| S-benzylcysteamine malate | 50 |
| Lactose | 300 |
| Powdered gum arabic | 100 |
| Simple syrup, q.s.p. | 500 |

These lozenges, when taken at the rate of 4 a day produce a long-lasting regression in the seborrhea.

EXAMPLE 5

Chewable pellets having the following composition are prepared:

|  | G. |
|---|---|
| Diacid phosphate of S-benzylcysteamine | 2.5 |
| Saccharose | 200 |
| Lemon syrup | 50 |

These pellets, when taken at the rate of a coffeespoonful twice a day, produce a notable regression in the seborrhea.

EXAMPLE 6

Tablets having the following composition are prepared:

|  | Mg. |
|---|---|
| N-oxide of 2-(2-amino ethylthio)-pyridine | 50 |
| Lactose | 150 |
| Gum arabic | 100 |
| Starch, q.s. | 500 |

These tablets, taken at the rate of six a day, constitute an effective treatment for seborrhea.

EXAMPLE 7

The following anti-seborrheic composition, adapted to be orally administered in drops, is prepared:

|  | G. |
|---|---|
| S-(methoxycarbonylmethyl) cysteine hydrochloride | 10 |
| Glycerine | 40 |
| Water, q.s.p. | 100 |
| Lemon tincture (q.s.p. impart an attractive aroma) | |

This composition when orally administered at the rate of ten drops per day for 15 days to a person suffering from seborrhea, notably reduces the seborrheic secretion.

EXAMPLE 8

A group of capsules, each containing the following composition, are prepared:

S-(methoxycarbonylmethyl)-l methyl cysteinate—50 mg.
Glucose—300 mg.
Water, q.s.p.—5 ml.
Raspberry sugar (sufficient to flavor)

This is orally administered at the rate of two capsules a day for 15 days to a person having greasy hair due to excessive secretion of sebum, and results in a substantial improvement in the condition of the scalp and the appearance of the hair.

EXAMPLE 9

An anti-seborrheic syrup having the following composition is prepared:

S-(carboxymethyl)-l cysteine—650 mg.
Water (sufficient to dissolve)
Black currant syrup, q.s.p.—250 ml.

This syrup, taken at the rate of one soupspoonful twice a day is an effective treatment for seborrhea.

EXAMPLE 10

Lozenges for oral consumption having the following composition are prepared:

|  | Mg. |
|---|---|
| S-trityl-l cysteine | 50 |
| Lactose | 300 |
| Powdered aromatic gum | 100 |
| Simple syrup, q.s.p. | 500 |

These lozenges, when taken at the rate of four a day result in a long-lasting regression in seborrhea.

EXAMPLE 11

Chewable pellets having the following composition are prepared:

|  | G. |
|---|---|
| S-(carboxy-2-ethyl)-l cysteine hydrochloride | 2.5 |
| Saccharose | 200 |
| Lemon syrup | 50 |

These pellets, when taken at the rate of a coffeespoonful twice a day result in a notable regression in seborrhea.

EXAMPLE 12

Tablets having the following composition are prepared:

|  | Mg. |
|---|---|
| S-(methoxycarbonylmethyl) cysteine hydrochloride | 50 |
| Lactose | 150 |
| Gum arabic | 100 |
| Starch, q.s.p. | 500 |

These tablets, taken at the rate of six a day, constitute an effective treatment for seborrhea.

What is claimed is:

1. A method for treating a scalp, characterized by an excessive secretion of sebum, to improve the condition thereof by reducing said excessive secretion of sebum comprising orally administering to a human being having a scalp so characterized a therapeutic composition comprising an ingestable carrier admixed with a non-toxic active compound selected from the group consisting of S-trityl-l cysteine, S-trityl-l cysteine hydrochloride, S-(carboxy-2-ethyl)-l cysteine, S-(carboxy-2-ethyl)-l cysteine hydrochloride, S-(carboxymethyl)-l cysteine, S-(methoxy carbonylmethyl)-1-cysteine, S-(methoxy carbonylmethyl)-1-cysteine hydrochloride, S-(methoxy carbonyl methyl)-1 methyl cysteinate, S-(methoxy carbonyl methyl)-1 methyl cysteinate hydrochloride, S-trityl-cysteamine, S-trityl cysteamine hydrochloride, S-benzyl cysteamine hydrochloride, the chloride of (3-β-aminoethylthio-2-hydroxy)-propyl-trimethylammonium hydrochloride, S-benzyl cysteamine dicitrate, S-benzylcysteamine salicylate, S-benzylcysteamine p-toluenesulfonate, S-benzylcysteamine nicotinate, S-benzylcysteamine hydrobromide, S-benzylcysteamine ditartrate, S-benzylcysteamine malate, S-benzylcysteamine dihydrogenophosphate, S-thenylcysteamine, S-thenylcysteamine hydrochloride, N-oxide of 2-(2-aminoethylthio)-pyridine, N-oxide of 2-(2-amino-ethylthio)-pyridine hydrochloride, S-benzylcysteamine ascorbate and S-(carboxymethyl)-l cysteine hydrochloride, said active compound being present in an amount ranging from 0.75 to 3 percent by weight of said composition and said composition being administered at a rate of 1 to 5 mg./kg./day based on the weight of the human being.

2. A method for treating a scalp, characterized by an excessive secretion of sebum, to improve the condition thereof by reducing said excessive secretion of sebum comprising orally administering to a human being having a scalp so characterized a therapeutic composition comprising an ingestable carrier admixed with S-carboxymethyl-1 cysteine hydrochloride as a non-toxic active compound, said S-carboxymethyl-1 cysteine hydrochloride being present in an amount ranging from 0.75 to 3 percent by weight of said composition and said composition being administered at a rate of 1 to 5 mg./kg./day based on the weight of the human being.

References Cited

UNITED STATES PATENTS

| | | | |
|---|---|---|---|
| 2,769,839 | 11/1956 | Fincke | 260—570.5 |
| 2,835,704 | 5/1958 | Walton | 260—570.5 X |
| 2,888,380 | 5/1959 | Brown et al. | 424—319 X |
| 3,326,762 | 6/1967 | Joullie et al. | 424—319 |

FOREIGN PATENTS

| | | | |
|---|---|---|---|
| 1,085,513 | 7/1954 | France | 260—501.21 |

OTHER REFERENCES

Stedman's Medical Dictionary, 1961, pp. 1340–1341.

ALBERT T. MEYERS, Primary Examiner

N. A DREZIN, Assistant Examiner